United States Patent [19]

Ishitani et al.

[11] Patent Number: 4,482,159

[45] Date of Patent: Nov. 13, 1984

[54] STERN TUBE SEAL DEVICE

[75] Inventors: Kenichiro Ishitani, Tokyo; Eiichi Kawamura, Saitama, both of Japan

[73] Assignees: Mitsubishi Jukogyo Kabushiki Kaisha; Eagle Industry Co., Ltd., both of Tokyo, Japan

[21] Appl. No.: 593,330

[22] Filed: Mar. 26, 1984

[51] Int. Cl.³ .................. F16J 15/40; F16J 15/38
[52] U.S. Cl. .................................. 277/3; 277/27; 277/59; 277/81 S; 277/192
[58] Field of Search .............. 277/3, 27, 59, 65, 71, 277/72 R, 72 FM, 79, 81 R, 81 S, 93 R, 93 SD, 192

[56] References Cited

U.S. PATENT DOCUMENTS

| 3,088,744 | 5/1963 | Ezekiel et al. | 277/3 |
| 3,565,447 | 2/1971 | Goetze et al. | 277/59 |
| 4,094,512 | 6/1978 | Back | 277/27 |
| 4,145,059 | 3/1979 | Imai et al. | 277/81 R |
| 4,183,540 | 1/1980 | Hytonen | 277/27 |

FOREIGN PATENT DOCUMENTS 939860  6/1982  U.S.S.R. ................... 277/3

Primary Examiner—Robert S. Ward
Attorney, Agent, or Firm—Jordan and Hamburg

[57] ABSTRACT

A stern tube seal device wherein an annular case member is arranged in the outer periphery of a shaft, a mechanical seal is arranged in a gap therebetween and at a position at the side of the ship, a limited leaking type seal is arranged at a position at the side of sea water, and pressure fluid is fed in the intermediate between both the seal members to enhance a sealing effect by pressure of the pressure fluid.

1 Claim, 4 Drawing Figures

STERN TUBE SEAL DEVICE

BACKGROUND OF THE INVENTION

The present invention relates to a stern tube seal device.

A stern tube seal device of this kind heretofore used is designed so that a mechanical seal is singly incorporated. In the prior art device of this kind, the mechanical seal directly seals sea water and lubricating oil (bearing oil), and therefore, there is a danger in that a sliding surface is damaged by slurry contained in sea water, thus making it difficult to maintain a stabilized sealing performance.

SUMMARY OF THE INVENTION

In view of the problems noted above, it is an object of the present invention to provide a stern tube seal device which is intended to enhance the sealing performance with respect to both sea water and lubricating oil and the slurry resisting performance.

To achieve the above-described object, a stern tube seal device in accordance with the present invention is designed so that a limited leaking type seal member is arranged externally of the mechanical seal (at the side of sea water), and pressure fluid is fed to the intermediate portion between both the seals, both the seals and pressure fluid cooperating one another to obtain the actual effect.

While the present invention has been briefly described, the present invention and other objects and novel features thereof will become completely apparent from reading of the following detailed description in connection with embodiments shown in the accompanying drawings. However, the drawings show the embodiments merely for the purpose of understanding the present invention and the scope of the present invention is not limited thereby.

DESCRIPTION OF THE PREFERRED EMBODIMENTS

Figure 1:
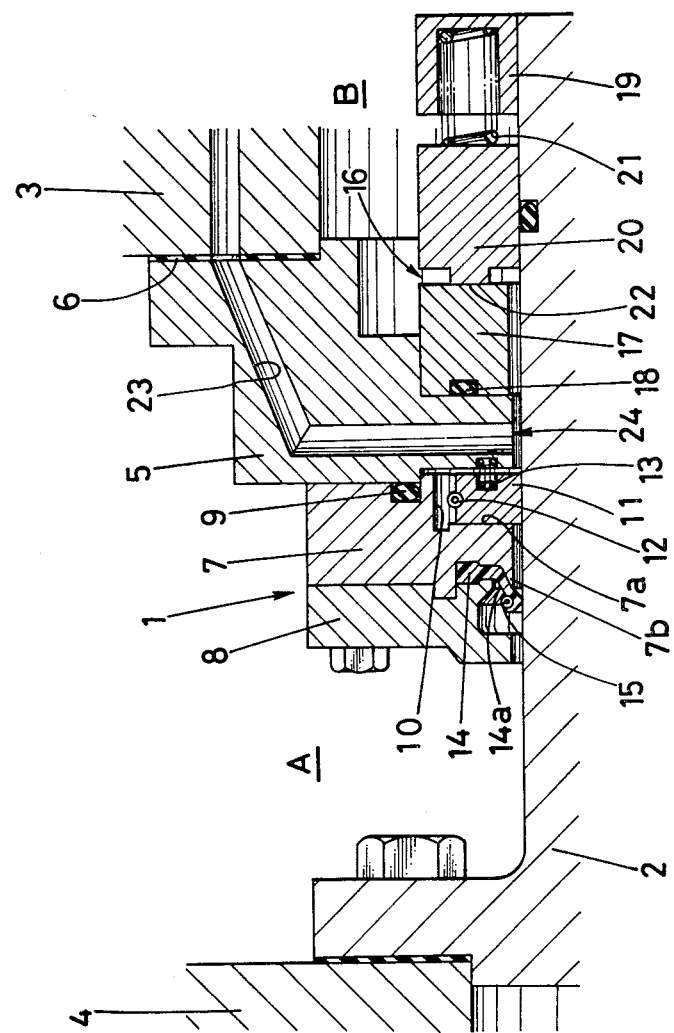
FIG. 1 is a sectional view cut in half of a stern tube seal device in accordance with one embodiment of the present invention.

In FIG. 1, the stern tube seal device generally indicated at 1 is mounted in an opening of a hole of a ship body 3 so as to seal between a sleeve 2 fitted externally of a shaft (not shown) and a ship body 3 in which the shaft is inserted. A reference numeral 4 designates a part of a propellor mounted on the extreme end of the shaft. In the stern tube seal device 1, a reference numeral 5 designates a first casing fixed to the end of the ship body 3 through a gasket 6, and on the side of sea water A of the first casing 5, a second casing (adapter ring) 7 and a third casing (aft cover) are airtightly fixed by suitable O-rings 9 or the like. In the inner peripheral surface of the second casing 7, an annular recess portion 10 is formed by the second casing 7 and the first casing 5 at the side of the ship, the annular recess portion 10 having a segment seal 11 as a limited leaking type seal mounted therein. This segment seal 11, which is circumferentially divided into plural portions, is fastened by a garter spring 12 fitted in the outer periphery thereof and is slidably moved in close contact with the peripheral surface of the sleeve 2 and brought into close contact with a wall surface 7a of the second casing 7 by a coiled spring 13 disposed at the side of ship. The divided elements of the segment seal 11 are stopped from rotating against the casings 5 and 7 by means of pins not shown projected from the first or second casing 5, 7. A reference numeral 14 designates a lip seal held and secured between the second and third casings 7 and 8, the lip seal having a pressure receiving surface 14a fastened by a garter spring 15 directed towards sea water and being slidably moved in close contact with the outer periphery of the sleeve 2. A back-up ring portion 7b for controlling excessive deformation of the lip seal 14 is provided on the back of the lip seal 14 of the second casing 7. A reference numeral 16 designates a mechanical seal arranged at a position closer to lubricating oil B in the inner periphery of a hole of the first casing 5, which seal is fitted in a shoulder of the first casing 5 and maintained airtight by an O-ring 18. The mechanical seal comprises a sliding ring 17 at the fixed side stopped for rotation against the casing 5 by means of a pin (not shown), a cover ring 19 fixed to the sleeve 2 by means of a pin (not shown) and a sliding ring 20 at the ratational side rotated as the shaft stopped for rotation by means of a pin (not shown) rotates. The sliding ring 20 at the rotational side is pressed by a coiled spring 21 to form a sealed sliding surface 22 in the surface in contact with the sliding ring 17 at the fixed side. A reference numeral 13 designates a pressure fluid feed line for feeding pressure fluid from the side of the ship body 3 towards a space 24 of an annular hole formed between the segment seal 11 and the mechanical seal 16, wherein a pipe line opening to the space through the first casing 5 from the ship body 3 is arranged, and a feed device (not shown) is provided within the ship body 3.

The stern tube seal device 1 constructed as described above is designed to prevent entry of sea water and slurry contained in sea water into the mechanical seal 16 by the lip seal 14 arranged externally of the mechanical seal 16 (on the sea water side), the segment seal 11 and the pressure fluid. It is noted that during sealing, as a rule, the feed device is actuated to feed pressure fluid. That is, first, the lip seal 14 and segment seal 11 serve to prevent entry of sea water A, and particularly, the segment seal 11 is pressed against the peripheral surface of the sleeve 2 and the wall surface 7a of the second casing 7 to enhance the sealing effect. When pressure of pressure fluid exceeds a certain level with respect to the segment seal 11 which is of a limited leaking type, the pressure fluid flows towards the lip seal 14 conversely but the pressure fluid is also balanced with sea water pressure to exhibit the sealing effect. When the space between the lip seal 14 and segment seal 11 is filled with pressure fluid, back pressure is applied to the lip seal 14 by the pressure fluid to place the lip seal 14 in an idling state balanced with sea water pressure thereby preventing early wear, deformation or the like due to the sliding contact between the lip seal 14 and sleeve 2. The lip seal 14 also acts as a dust seal which prevents entry of foreign matter into the ship, but when pressure of pressure fluid at the rear decreases for some reason, the lip seal is pressed by sea water pressure into close contact with the sleeve 2 to automatically act as a first sea water resisting seal. It is noted that the pressure fluid might spread the lip seal 14 depending on pressure and flows outside the ship, and therefore, air, nitrogen gas, clean water or the like which involves no problem such as public hazards even if the fluid leaks into sea water are desirable for use. On the other hand, lubricating oil B can be completely sealed by the mechanical seal 16 which has been increased in durable sealing properties by the above-described structure.

Figure 2:
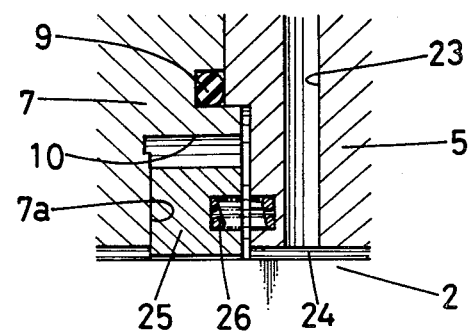
FIGS. 2 to 4 are respectively sectional views showing essential parts of a stern tube seal device in accordance with modified embodiments of the present invention.
Figure 3:
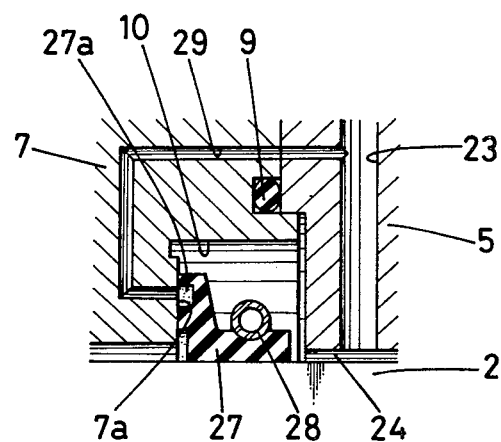
Figure 4:
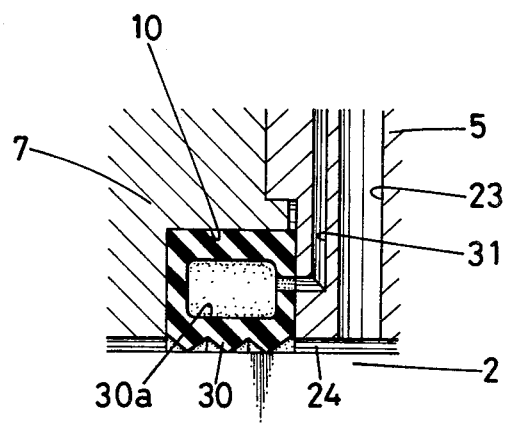

Next, FIGS. 2 to 4 show modified embodiments of the present invention in which in place of a segment seal of a limited leaking type seal described in the previous embodiment, an integral type (which is not divided peripherally) floating ring seal 25 (FIG. 2), an end type rubber seal 27 (FIG. 3) or a hollow type pressure ring 30 (FIG. 4) is used. That is, a floating ring seal 25 shown in FIG. 2 is stopped for rotation by means of a pin (not shown) mounted on the first or second casing 5, 7 and pressed by a coiled spring 26 in contact with the wall surface 7a of the second casing 7 and has a fine clearance relative to the peripheral surface of the sleeve 2 to seal pressure fluid in a manner of limited leaking type. An end type rubber seal 27 shown in FIG. 3 is slipped over the sleeve 2 by a garter spring 28 to form a sealed sliding surface relative to the wall surface 7a of the second casing 7 to seal fluid by said surface. A flushing line 29 is open to an annular groove 27a formed in said surface from the second casing 7. This flushing line is branched from the pressure fluid feed line 23, and clean water is used as a feed fluid to thereby provide lubricating for the sliding surface. A hollow type pressure ring 30 shown in FIG. 4 is mounted in close contact with the first and second casings 5 and 7 as if filled in the annular recess portion 10, and is branched from the pressure fluid feed line 23 relative to the hollow portion 30a or fed with pressure air from a line 31 separately provided so that it is expanded in a direction of inside diameter to come into close slidable contact with the peripheral surface of the sleeve 2. Use of the pressure type hollow ring 30 enables varying the state of close contact with the peripheral surface of the sleeve 2 by controlling a feed amount of the pressure air to adjust a leaking amount of the pressure fluid. An inner peripheral surface portion of the hollow ring 30, which is normally formed of synthetic rubber or the like, can be formed of a sliding material such as fluororesin to thereby enhance the wear resistance.

In the stern tube seal device of the present invention, generally, a limited leaking type seal member is arranged externally of a mechanical seal disposed at the side of ship, and pressure fluid against sea water pressure is fed into an intermediate portion between both the seals whereby sea water and slurry contained in said sea water do not reach the mechanical seal, as described above. Therefore, it is possible to prevent a damage given to the sliding surface of the mechanical seal resulting from the slurry to enhance the sealing performance. Since the pressure fluid is basically maintained in the state wherein it is sealed between both the seals (the limited leaking type seal and mechanical seal), even if a small amount of fluid should be leaked outside the ship, a quantity of consumption of the pressure fluid could be minimized.

While the preferred embodiments of the present invention have been described, it will be apparent that the present invention can be variously modified without departing the principle thereof. It is therefore desired that all the modifications, by which the effects of the present invention are obtained substantially through the use of substantially identical or corresponding structures, are included in the category of the present invention by the appended claim.

What is claimed is:

1. A stern tube seal device characterized in that an annular case member is arranged in the outer periphery of a shaft, a mechanical seal for sealing a portion between said case member and the peripheral surface of the shaft is disposed at a position closer to the ship in the inner periphery of said case member, an annular recess portion is formed externally of the ship of said mechanical seal in the inner peripheral surface of said case member, a limited leaking type seal in sliding relation with the peripheral surface of the shaft is fitted into said annular recess portion, and a pressure fluid feed line, which is open to an annular space between said limited leaking type seal and said mechanical seal is feed pressure fluid, is provided.

* * * * *